United States Patent [19]

Nakamura et al.

[11] 3,898,793

[45] Aug. 12, 1975

[54] BEARING SYSTEM FOR GAS TURBINE ENGINE

[75] Inventors: Kenya Nakamura; Akira Sato, Susono, both of Japan

[73] Assignee: Toyota Jidosha Kogyo Kabushiki Kaisha, Japan

[22] Filed: Aug. 8, 1973

[21] Appl. No.: 386,493

[30] Foreign Application Priority Data
Aug. 17, 1972 Japan.............................. 47-81794

[52] U.S. Cl. ............. 60/39.08; 60/39.36; 60/39.66; 60/39.74 S; 415/112; 415/113; 415/116; 184/6.11
[51] Int. Cl. ................................................ F02c 7/06
[58] Field of Search ......... 60/39.08, 39.66, 39.74 S, 60/39.36; 415/111–113, 116; 184/6.11; 308/DIG. 1

[56] References Cited
UNITED STATES PATENTS

| | | |
|---|---|---|
| 2,926,050 | 2/1960 | Battle.............................. 60/39.66 X |
| 3,035,759 | 5/1962 | Paulson et al. .................. 415/111 X |
| 3,105,631 | 10/1963 | Hanny............................. 415/112 X |
| 3,163,003 | 12/1964 | Paul et al........................... 60/39.36 |
| 3,321,910 | 5/1967 | Davies et al. ...................... 60/39.08 |
| 3,728,857 | 4/1973 | Nichols........................... 184/6.11 X |

Primary Examiner—C. J. Husar
Assistant Examiner—Robert E. Garrett
Attorney, Agent, or Firm—Toren, McGeady and Stanger

[57] ABSTRACT

A bearing system for use in a gas turbine engine includes a hermetically isolated bearing chamber formed in the vicinity of a high temperature portion of the main shaft of the engine. A dynamic pressure type gas bearing mounted in the bearing chamber frictionlessly supports the main shaft without lubricant when air is introduced into the bearing chamber from an air passage communicating the bearing chamber with the compressor of the turbine engine. Means for discharging air from the bearing chamber includes means forming a labyrinthine outlet flow path operating to regulate the flow rate of the discharged air.

8 Claims, 2 Drawing Figures

BEARING SYSTEM FOR GAS TURBINE ENGINE

BACKGROUND OF THE INVENTION

1. Field of the Invention

The present invention relates generally to improvements in a bearing system including a dynamic pressure type gas bearing for use in a gas turbine engine. More particularly the invention relates to improvement in a bearing mechanism of the above type which operates to frictionlessly support a turbine main shaft at a high temperature portion thereof.

2. Description of the Prior Art

Gas bearing systems are well known in the art as bearings for high temperature and high speed applications because they utilize air as a supporting medium and as such they have a much smaller coefficient of friction than a bearing system of the oil type. In view of the advantages of the gas bearing system, consideration has been given to the possibility of its use as applied for supporting a high temperature portion of the main shaft of a gas turbine engine. Although such a gas bearing system utilizes so called dynamic pressure, it is nevertheless subject to leakage of hot gases from the combustion chamber into the bearing chamber of the system where the gas bearing is accommodated. Because of this, the bearing portion of the system is likely to suffer seizure, thermal breakage or similar operational difficulties due to local overheating. Accordingly, such gas bearing systems have been seldom used as supporting mechanisms for the bearing portions of gas turbine engines despite their many attendant technical advantages.

Accordingly, it is an object of the present invention to provide an improved gas bearing system for use in connection with gas turbine engines.

Another object of the invention is to provide a gas bearing system wherein a portion of the air discharge from the compressor of the engine is supplied partly for cooling the bearing portion of the system and partly for supporting a high temperature portion of the turbine main shaft.

SUMMARY OF THE INVENTION

Briefly, the present invention may be defined as comprising a bearing system for supporting the main shaft of a gas turbine engine wherein the engine includes a compressor for delivering air to the engine, a turbine for rotatively propelling said main shaft, and a combustion chamber producing hot gases for delivery to said turbine. The invention is particularly concerned with the structure of the bearing system comprising a bearing chamber which is hermetically isolated from other portions of the engine, a dynamic pressure type gas bearing mounted within said chamber for frictionlessly supporting the main shaft of the turbine engine when air under pressure is introduced into said bearing chamber, air passage means for introducing air under pressure from the compressor into the bearing chamber, air outlet means defining a flow path for discharging air from the bearing chamber and means for regulating the flow path of the air passing out of the bearing chamber through the air outlet means. More specifically, the invention contemplates the inclusion of means which will define a labyrinthine path for the bearing chamber air outlet thereby controlling flow rates without interfering with shaft or turbine rotation.

BRIEF DESCRIPTION OF THE DRAWING

The present invention and other objects and advantages thereof will be better understood from the following detailed description of a preferred embodiment taken in connection with the accompanying drawings, in which.

DESCRIPTION OF THE PREFERRED EMBODIMENT

Figure 1:
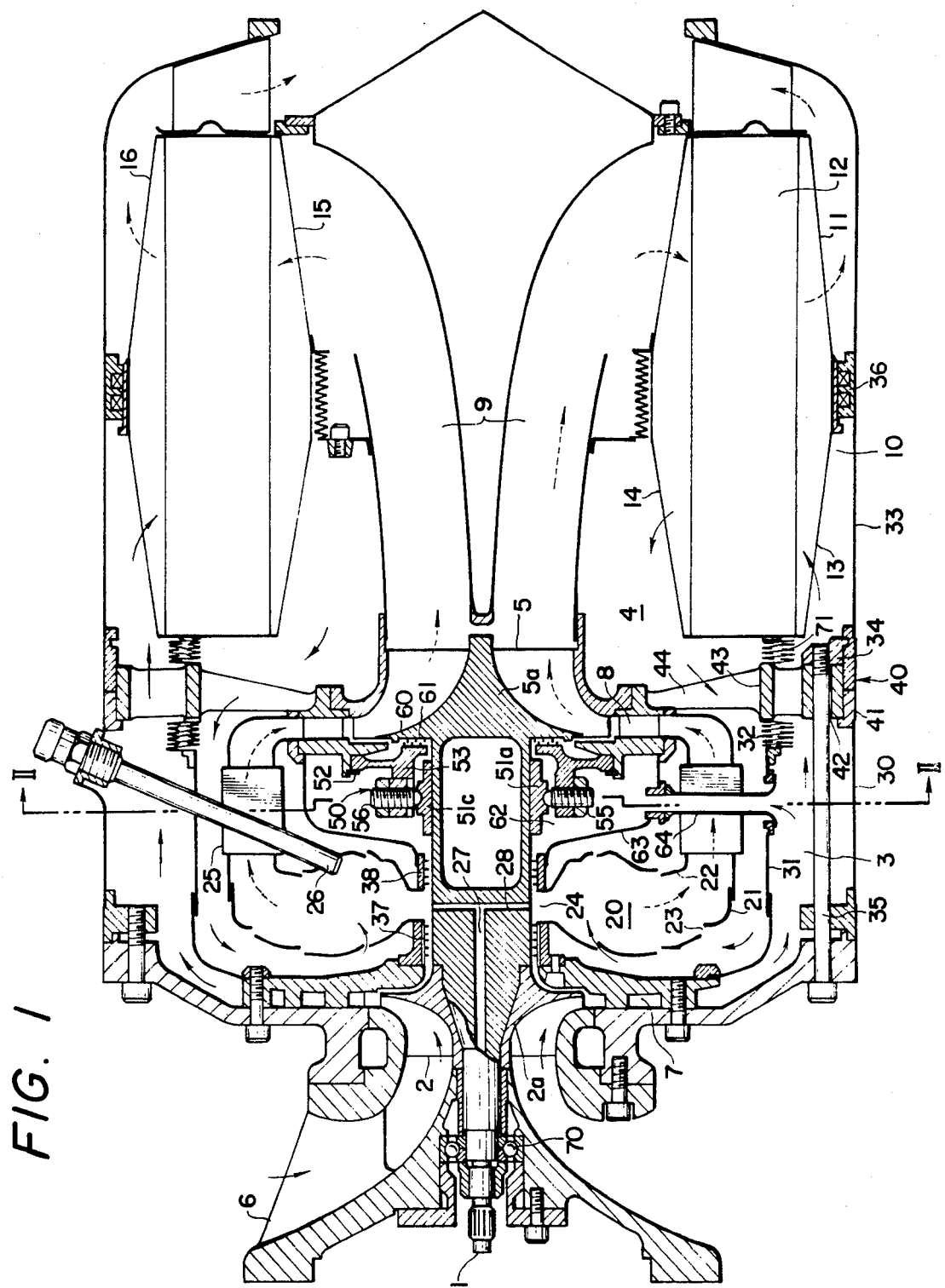
FIG. 1 is a longitudinal sectional view showing a gas turbine engine in which a dynamic pressure type gas bearing system according to the present invention is incorporated.

Referring now to the drawings, the invention is structured in connection with a gas turbine engine which generally comprises a compressor 2 of the centrifugal type and a radial turbine 5. The compressor 2 is connected to a turbine main shaft 1 thereby to introduce air at low temperature and under high pressure into the engine. The air thus conditioned is subsequently introduced through a passage 3 into a heat exchanger 10 within which the air is heated to produce pressurized hot air. This pressurized hot air is then supplied through another passage 4 to a combustion chamber 20 into which a suitable fuel is injected to be burned with the supplied air in order to thus produce combustion gases. These combustion gases are introduced into the radial turbine 5 which is also connected to the turbine main shaft 1 and which operates to effect rotation thereof. Subsequently, the combustion gases are returned, at a relatively high temperature and under a reduced pressure, to the heat exchanger 10 for regenerative heating purposes. After the regenerative heat exchange operation, the combustion gases are discharged into the atmosphere. The aforementioned operations are cyclically performed in order to produce an engine output which may be extracted from the turbine main shaft 1.

More specifically, the centrifugal compressor 2 is provided with an impeller wheel 2a which is mounted in an air intake 6 and which is integrally formed with the turbine main shaft 1. The compressor 2 includes cylindrical outer and inner shells 30 and 31, both of which cooperatively define the air passage 3 disposed downstream of a diffuser 7. When the impeller wheel 2a is rotated together with the main shaft 1, fresh air is drawn through the air intake 6 to be compressed by the rotated impeller wheel 2a thereby to be converted into pressurized cold air which is subsequently introduced into the air passage 3 through the diffuser 7. Attached to the inner end of the outer shell 30 is a turbine nozzle supporting member 40 including a reinforcing ring 41. The supporting member 40 hermetically covers the entire periphery of the outer shell 30 and is composed of an outer ring 42 fitted into the reinforcing ring 41. The supporting member 40 also includes an intermediate ring 43 connected through a bellows 32 to the inner shell 31, and struts 44 radially extending to form an integral portion of the unitary structure depicted. An intermediate ring 43 has attached to the inner wall thereof a turbine nozzle 8 having a cylindrical shape. At the right hand side of the supporting member 40 of the housing 33, a housing 33 is fitted and integrally secured to the outer ring 42 through a hook by means of bolts 35. The heat exchanger 10, which is of a stationary type, is attached to the inner wall of the housing 33 by means of a supporting ring 36. The heat exchanger 10 generally includes: a casing 11 connected through the bellows 71 to the intermediate ring 43 of the supporting member 40; a core 12; an air inlet 13 having gas communication with the air passage 3; an air outlet 14 having gas communication with the air passage 4; an exhaust gas inlet 15 having gas communication with the exhaust duct 9; and an exhaust gas outlet 16 vented to the atmosphere. With these structural arrangements, the heat exchanger 10 operates to regenerate the thermal energy contained in the exhaust which circulates from the exhaust duct 9 to the atmosphere through the exhaust gas inlet and outlet 15 and 16. This regeneration occurs by heat exchange which occurs between the exhaust gases and the air under pressure which is introduced from the air passage 3 into the air passage 4 through the air inlet and outlet 13 and 14.

The combustor 20 is formed at the inner side of the inner shell 31 and in the inside of the air passage 4, and it has one end connected to the turbine nozzle 8. At its opposite end, the combustor 20 includes 2 labyrinth rings 37 and 38 disposed around the turbine shaft 1 and spaced a limited distance therefrom. Outer and inner cylinders 21 and 22 are connected, respectively, to the labyrinth rings 37 and 38, and a plurality of air vent holes 23 formed in the outer and inner cylinders 21 and 22 provide gas communication with the air passage 4. A fuel supply port 24 opens into the combustor 20 at a portion of the main shaft 1 which is not covered by the labyrinth rings 37 and 38. As is apparent from the drawings, the fuel supply port 24 is located between the rings 37 and 38. A plurality of pipes 25, preferably eight in number, are peripherally arranged between the outer and inner cylinders 21 and 22, and a spark plug 26 extends from the outside of the outer shell 30 into the inside of the combustor 20 through the air passages 3 and 4 and through one of the pipes 25. A plurality of fuel injection bores 28 opening at the fuel supply port 24 of the combustor 20 are in fluid communication with a fuel supply passage 27 formed axially in the main shaft 1. As a result, when a suitable fuel is supplied, by fuel supply apparatus (not shown) into the fuel injection bores 28 through the fuel supply passage 27, the supplied fuel is subjected to centrifugal force due to the high speed rotation of the main shaft 1. Thus the fuel may be injected into the combustor 20 in an atomized condition. The fuel thus atomized is mixed with the pressurized hot air in the combustor 20 and is ignited by the spark plug 26 and thereby burned to produce combustion gases which are then passed to the turbine nozzle 8.

A turbine wheel 5a welded to one end of the turbine main shaft 1 is provided in the radial turbine 5. The turbine wheel 5a receives, in a conventional manner, the combustion gases from the turbine nozzle 8 in a radially inward direction and is rotated thereby as a result of the expansion of these gases. After having been expanded the combustion gases remain relatively hot but are reduced in pressure. Subsequently, the resultant gases are introduced into the exhaust duct 9 while the turbine wheel 5a rotates together with the turbine main shaft 1 to generate an engine output, a portion of which is extracted at the side of the centrifugal compressor 2.

Figure 2:
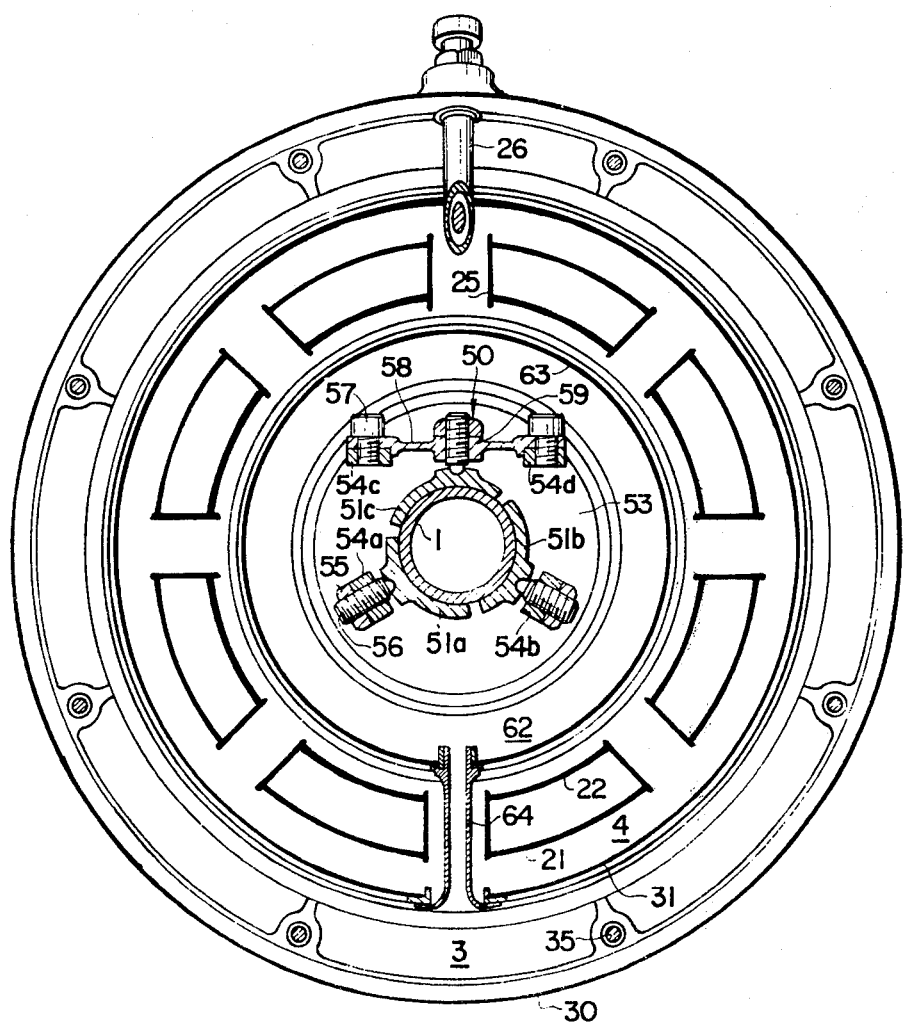
FIG. 2 is a cross-sectional view taken along the line II—II of FIG. 1.

In the gas turbine enging thus constructed, a gas bearing 50 of the dynamic pressure type is provided adjacent the main shaft 1 between the hot radial turbine 5 and the combustor 20. A deep groove ball bearing 70 supporting the main shaft is provided at the side of the air intake 6. The gas bearing 50 generally includes bearing pads 51a, 51b and 51c, preferably three in number, mounted on the outer periphery of the main shaft 1 and angularly spaced from each other. A holder 53 is fitted into the turbine nozzle 8 and is locked by a retaining ring 52. In the holder 53 there are formed, preferably four cradles 54a–54d, with two of the cradles 54a and 54b having directly threaded therein by means of a lock nut 55 each of an adjusting screw 56. The round tips of the adjusting screws 56 respectively support two, i.e. 51a and 51b, of the three bearing pads which are located at the lower side of the turbine main shaft 1. As will be more apparent from FIG. 2, a leaf spring 58 acting as a shock absorber is secured to the remaining two cradles 54c and 54d by means of bolts 57. At the central portion of the leaf spring 58 there is formed a seat 59 into which one of the adjusting screws 56 is threaded by means of the lock nut 55. The remaining bearing pad 51c is thus supported by the round tip of the last-mentioned adjusting screw 56. On the facing surfaces of both the holder 53 and of the turbine wheel 5a there are mounted, respectively, integrally formed labyrinth rings 60 and 61 having concentric projections which are alternately spaced from each other. These concentric alternately spaced projections operate to regulate the flow rate of the air which passes therebetween. A bearing chamber 62 which is formed in the air passage 4 is structured to be isolated from the combustion gases. The bearing chamber 62 is defined by an outer wall 63 which hermetically connects the turbine nozzle 8 and the labyrinth 38. In the bearing chamber 62 there are accomodated the gas bearing 50 and the labyrinth rings 60 and 61. The bearing chamber 62 communicates with the air passage 3 by way of a pipe 64, which is of a relatively small diameter, and which is hermetically connected to both the inner shell 31 and the outer wall 63 through a pipe 25. As a result of this structural configuration a portion of the cold air flowing into the air passage 3 in a pressurized state is introduced into the bearing chamber 62 through the pipe 64.

A portion of the cold air under pressure which is discharged through the centrifugal compressor 2 to the diffuser 7 and then to the air passage is supplied through the pipe 64 to the bearing chamber 62 and it cools the gas bearing 50. Subsequently, this portion of the air is partially guided through a labyrinthine path formed in the spacing between the labyrinth ring 38 and the outer periphery of the turbine main shaft 1. As a result, this labyrinthine path formed by the labyrinth 38 appropriately regulates the flow rate of air passing therethrough. The regulated air is introduced into the combustor 20 while the remaining air is discharged at a desirable flow rate into the outlet portion of the turbine nozzle 8 after having passed through a labyrinthine path defined by a clearance between the labyrinth rings 60 and 61. Accordingly, as the gas bearing 50 is continuously supplied with cold air, it supports the main shaft 1 by means of the lower bearing pads 51a and 51b when the shaft 1 is in a stationary condition. However, when the main shaft 1 is rotated at high speed, an air layer under high pressure is formed between the inner peripheries of the bearing pads 51a–51c and the outer periphery of the main shaft 1 as a result of the air surrounding the main shaft being forced by the rotated main shaft 1 to enter between both peripheries. The air layer thus formed will support the main shaft 1 in a floating condition and, accordingly, the main shaft will be rotatably supported without lubricant and without obstructive contact with the bearing pads 51a–51c.

The prevailing pressure in the combustor 20 is lower than that of the incoming air flow which is discharged from the centrifugal compressor 2 by an amount equal to the sum of the pressure loss caused when the air flows through the core 12 of the heat exchanger 10, and of the pressure loss caused by flow through the air vent holes 23 of the combustor outer cylinder 21. The pressure in the outlet portion of the turbine nozzle 8 is reduced by a pressure loss resulting from the expansion of the combustion gases as they pass through the blades of the turbine nozzle 8. Consequently, the hot combustion gases will not leak into the bearing chamber 62 through the labyrinth rings 38, 60 and 61.

Without the flow rate regulating action of these labyrinth rings 38, 60, and 61, a major portion of the prevailing air in the bearing chamber 62 would be discharged to the outlet portion of the turbine nozzle 8. If this should occur, sufficient cooling of the gas bearing 50 could be obtained, but a rather large amount of cold air under pressure which has been compressed in the centrifugal compressor 2 would be uselessly discharged. This discharge would occur without performance of any work at the radial turbine 5 and at the same time the combustion gases flowing around the turbine 5 would be excessively cooled thereby effecting the deterioration of the obtainable outlet performance of the gas turbine engine involved. In the absence of the rings 38, 60, and 61 such undesirable phenomena will undoubtedly occur since the pressure differential between the bearing chamber 62 and the combustor 20 is maintained at a relatively low level due to the small pressure loses in the core 12 of the heat exchanger 10 and in the air vent holes 23 of the combustor outer cylinder 21. Also, the pressure differential between the bearing chamber 62 and the outlet portion of the turbine nozzle 8 is larger than the pressure differential between the bearing chamber 62 and the combustor 20 because of large pressure drop caused by the expansion of the combustion gases at the turbine nozzle 8. However, these disadvantages are obviated by the provision of the labyrinth rings 60 and 61 which operate to regulate the air flow rate of the air flowing to the turbine nozzle 8 maintaining this rate at a minimum level required. From the point of view of the design of the apparatus, it should also be appreciated that the restrictions in the selection of the inner diameter of the pipe 64 and of the number of pipes provided, can be remarkably reduced.

In accordance with a modification of the structure described the labyrinth ring 38 need not necessarily be fitted on the inner periphery of inner cylinder 22 of the combustor 2, but it may be disposed on the opposite outer periphery of the turbine main shaft 1 to provide similar results. Likewise, the labyrinth ring 61 need not be limited to extend only to the rear surface of the turbine wheel 5a but it may be formed to extend to the outer periphery of the main shaft 1.

As has been described in detail, a portion of the air which has been compressed by the compressor 2 is utilized to enable the gas bearing 50 to frictionlessly support the high temperature portion of the turbine shaft 1 without lubricant. This type of support in such an arrangement has been considered inpractical until the advent of the present invention. The concept of using a portion of the cold air coming from the compressor 2, which until the present invention has been accompanied by undesirable phenomena, can now be placed into practical application by utilization of a gas bearing 50 of the dynamic pressure type without introducing any significant drawbacks in the operation of the device, and the gas bearing 50 can itself be sufficiently cooled without serious problems such as seizure or thermal breakage.

Although the disclosed embodiment of the present invention has been described in connection with a gas turbine engine employing a turbine of the radial type, such description has been provided for illustrative purposes only and it should be noted that the present invention could be also be applied to a gas turbine engine having a turbine of the axial type.

While specific embodiments of the invention have been shown and described in detail to illustrate the application of the inventive principles, it will be understood that the invention may be embodied otherwise without departing from such principles.

What is claimed is:

1. In a bearing system for supporting the main shaft of a gas turbine engine, said engine including a compressor for delivering air to said engine, a turbine for rotatively propelling said main shaft, and a combustion chamber producing hot gases for delivery to said turbine, the improvement comprising a bearing chamber located intermediate said combustion chamber and said turbine hermetically isolated from other portions of said engine, a dynamic pressure type gas bearing mounted within said bearing member for frictionlessly supporting said main shaft when air under pressure is introduced into said bearing chamber, air passage means for introducing air under pressure from said compressor into said bearing chamber, air outlet means defining a flow path for discharging air from said bearing chamber, and means for regulating the flow of air passing through said outlet means.

2. A system according to claim 1 wherein said regulating means comprise labyrinthine means defining a labyrinthine flow path located within said air outlet means.

3. A system according to claim 2 wherein said labyrinthine means include portions located to extend between said bearing chamber and said main shaft and configured to define a labyrinthine flow path for air flowing from said bearing chamber without interferring with rotation of said shaft relative to said bearing chamber.

4. A system according to claim 2 wherein said labyrinthine means include portions located to extend between said bearing chamber and said turbine and configured to define a labyrinthine path for air flowing from said bearing chamber without interfering with the rotation of said turbine relative to said bearing chamber.

5. A system according to claim 2 wherein said air outlet means comprise a pair of opposed walls defining the limits of the flow path of said discharging air and wherein said labyrinthine means comprise a plurality of webs, each of said webs extending from one of said walls and terminating at a point spaced from the other of said walls, said webs being spaced apart and extending in an overlapping configuration.

6. A system according to claim 2 wherein said labyrinth means are constructed in an annular configuration extending about said main shaft.

7. A system according to claim 6 wherein said labyrinth means are formed to include a pair of labyrinth rings extending about said main shaft on opposite sides of said gas bearing, one of said rings defining a labyrinthine air outlet flow path between said bearing chamber and said combustion chamber and the other of said rings defining a labyrinthine air outlet flow path between said bearing chamber and said turbine.

8. A system according to claim 1 wherein said main shaft is structured with said compressor and said turbine rotatively mounted thereon at spaced apart locations with said bearing chamber located therebetween adjacent said main shaft.

* * * * *